| | | |
|---|---|---|
| United States Patent [19] | [11] | 4,211,644 |
| Wiechers | [45] | Jul. 8, 1980 |

[54] FROTH FLOTATION PROCESS AND COLLECTOR COMPOSITION

[75] Inventor: Adriaan Wiechers, Pretoria, South Africa

[73] Assignee: Pennwalt Corporation, Philadelphia, Pa.

[21] Appl. No.: 852,413

[22] Filed: Nov. 17, 1977

[30] Foreign Application Priority Data

Nov. 26, 1976 [ZA] South Africa .................. 76/7089

[51] Int. Cl.$^2$ ............................................. B03D 1/02
[52] U.S. Cl. ........................................ 209/166; 252/61
[58] Field of Search .................. 209/166, 167; 252/61

[56] References Cited

U.S. PATENT DOCUMENTS

| | | | |
|---|---|---|---|
| 1,260,668 | 3/1918 | Hebbard | 209/167 |
| 1,709,447 | 4/1929 | Tunison | 209/166 X |
| 1,728,764 | 9/1929 | Keller | 209/166 X |
| 1,750,651 | 3/1930 | Vignus | 252/351 X |
| 1,839,155 | 12/1931 | Lubs | 209/166 |
| 1,904,460 | 4/1933 | Moses | 209/166 |
| 1,974,885 | 9/1934 | Wigton | 209/160 |
| 2,073,492 | 3/1937 | Ray | 209/166 |
| 2,088,085 | 7/1937 | Gross | 252/351 X |
| 2,090,259 | 9/1937 | Anderson | 209/166 |
| 2,125,337 | 8/1938 | Gaudin | 209/166 |
| 2,129,709 | 9/1938 | Schuette | 252/351 X |
| 2,133,480 | 10/1938 | Schoelle | 252/351 X |
| 2,177,985 | 10/1939 | Harris | 209/166 |
| 2,213,477 | 9/1940 | Steondorff | 252/351 X |
| 2,259,420 | 10/1941 | Hills | 209/166 |
| 2,302,338 | 11/1942 | Moeller | 209/166 |
| 2,570,529 | 10/1951 | Handley | 209/166 X |
| 2,636,604 | 4/1953 | Anderson | 209/166 |
| 2,637,701 | 5/1953 | Doess | 252/351 X |
| 2,647,629 | 8/1953 | Veltman | 209/166 |
| 2,797,808 | 7/1957 | Tveter | 209/166 |
| 2,816,870 | 12/1957 | Hertz | 209/166 X |
| 2,965,678 | 12/1960 | Sundberg | 252/351 X |
| 3,005,853 | 10/1961 | Wilgus | 252/351 X |
| 3,595,390 | 7/1971 | Booth | 209/166 |
| 3,623,605 | 11/1971 | Perri | 209/166 |
| 3,640,382 | 2/1972 | Jepsen | 209/166 X |
| 4,122,004 | 10/1978 | Harris | 209/166 |
| 4,130,477 | 12/1978 | Podobnik | 209/166 |

FOREIGN PATENT DOCUMENTS

| | | | |
|---|---|---|---|
| 575644 | 5/1959 | Canada | 209/166 |
| 1011166 | 4/1952 | France | 209/166 |
| 1011183 | 4/1952 | France | 209/166 |

*Primary Examiner*—Robert Halper

[57] ABSTRACT

A collector composition for use in concentrating metallic mineral ores by froth flotation which comprises a mixture of a mercaptan and an emulsifying or wetting agent adapted to improve the dispersion of the mercaptan into the pulp, and a froth flotation method for concentrating metallic mineral ores wherein the above collector composition is employed as the collector, are disclosed herein.

26 Claims, No Drawings

FROTH FLOTATION PROCESS AND COLLECTOR COMPOSITION

This invention relates to a method of froth flotation, and to a collector composition for use in froth flotation.

Froth flotation is a process commonly employed for separating, collecting and hence concentrating valuable minerals, particularly sulphide and oxide ores, from the gangue minerals associated with these minerals in their ores. It comprises the following usual steps:

The ore is crushed and subjected to wet grinding whereby the ore particles are typically reduced to $-48+500$ ASTM mesh with about 30 to 50% of the particles being in the $-200$ mesh range. The ore is formed into a mineral pulp, by dilution with water to approximately 20 to 50% solids by weight. To the pulp are added various frothing, conditioning and collecting agents. The pulp is then aerated to produce air bubbles which rise to the pulp surface and to which the desired mineral particles attach themselves by virtue of the collector(s) employed, permitting removal of these minerals in concentrated form. This concentrate may then be further processed by various other means for the economical and profitable production of the appropriate metal(s).

According to the invention, in the recovery of metal values by froth flotation from metallic mineral ores, wherein a mercaptan is used as a collector, there is provided the method which includes the step of, prior to addition of the mercaptan collector to the mineral pulp, thoroughly mixing the mercaptan with an emulsifying or wetting agent, thereby the improve the dispersion of the mercaptan into the pulp.

"Improve" means that the mercaptan becomes more quickly and thoroughly dispersed in the pulp.

The emulsifying or wetting agent may be soluble in water, and the mercaptan and emulsifying or wetting agent may be soluble in each other, the mixture being added to the pulp in the form of a solution.

The mercapatan may be an alkyl mercaptan according to the formula $C_nH_{2n+1}SH$, and the value of n may be from 12 to 16 inclusive.

The collector may comprise a mixture or alkyl mercaptans, the froth flotation being carried out at a temperature where the mixture is a liquid.

The emulsifying or wetting agent may be a glycol, and the glycol may be a polyglycol having the general formula (I):

$$R_1-(O-R_2)_m-OH \quad (I)$$

in which:
$R_1$ is phenyl, alkyl substituted phenyl, alkyl, hydrogen or a saturated heterocyclic group,
$R_2$ is an alkylidene group; and
the polyglycol has a molecular weight between 50 and 2000.

The polyglycol may have the general formula (II):
$$R_1-(O-R_3)_n-(O-R_4)_p-OH \quad (II)$$

in which:
$R_1$ is as defined for formula (I);
$R_3$ is $-CH_2-CH_2-$;
$R_4$ is

and
n and p are both greater than 0, n and p both preferably being from 2 to 5 inclusive. The polyglycol may thus be a polyethylene polypropylene glycol mono(4-alkylphenyl) ether of the formula (II) in which:
$R_1$ is $R_5-C_6H_4-$ in which $R_5$ is a normal or branched alkyl group having 1 to 10 carbon atoms and $-C_6H_4-$ is a disubstituted benzene, or
the polyglycol may be a polyethylene polypropylene glycol ether of the formula (II) in which:
$R_1$ is a normal or branched alkyl group having 1 to 12 carbon atoms.

Instead, the polyglycol may be a water soluble polyethylene glycol mono (4-alkylphenyl) ether of the formula (I) in which:
$R_1$ is $R_5-C_6H_4-$, $R_5$ being a normal or branched alkyl group having 1 to 10 carbon atoms, and $-C_6H_4-$ being a disubstituted benzene; and
$R_2$ is $-CH_2-CH_2-$, or
the polyglycol may be a polyethylene glycol alkyl ether of the formula (I) in which:
$R_1$ is a normal or branched alkyl group having 1 to 12 carbon atoms; and
$R_2$ is $-CH_2-CH_2-$.

Instead, the polyglycol may be a water soluble polyoxyethylene glycol of the formula (I) in which:
$R_1$ is hydrogen; and
$R_2$ is $-CH_2-CH_2-$,
or the polyglycol may be a water soluble polyoxypropylene glycol of the formula (I) in which:
$R_1$ is hydrogen; and
$R_2$ is

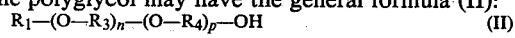

The polyglycol preferably has a molecular weight between 200 and 1000.

The metal values recovered may contain one or more minerals selected from the group consisting of oxides and sulphides, and the metal values recovered may contain one or more metals selected from the group consisting of copper, zind, platinum, nickel, lead, antimony, arsenic, chromium, silver and gold.

The metal values may be recovered from ores which exhibit a resistance to collection from alkaline flotation froths and which comprise one or more minerals selected from the group consisting in valeriite and cubanite.

The mercaptan collector may be used together with another collector selected from the group consisting in xanthates, mercaptobenzothiazoles, dithiocarbamates, thionocarbamates and dithiophosphates. When the other collector is a xanthate, the ratio on a weight basis between the mercaptan and the xanthate may be between 8:3 and 8:4.

Between 0.01 and 0.5 kg of mercaptan may be used for each tonne of ore processed.

The froth flotation may be carried out in a plurality of stages, the mixture of mercaptan and the emulsifying or wetting agent being added to the pulp in several of the stages. When the flotation is carried out in a plurality of stages and the mixture of mercaptan and emulsifying or wetting agent is used together with another collector, the mixture of the mercaptan and the emulsifying or wetting agent is preferably first added to the pulp in a stage downstream in which the other collector is first added to the pulp.

The mixture of mercaptan and the emulsifying or wetting agent may comprise more than 50% of mercaptan on a volume basis, preferably from 70% to 95% mercaptan on a volume basis, and more preferably from 80% to 90% mercaptan on a volume basis.

Further according to the invention a collector composition for use in the recovery of metal values by froth flotation from metallic mineral ores comprises a mixture of a mercaptan and an emulsifying or wetting agent adapted to improve the dispersion of the mercaptan into the mineral pulp.

The emulsifying or wetting agent may be soluble in water, and the mercaptan and the emulsifying or wetting agent may be soluble in each other, the composition being in the form of a solution of the components thereof in each other.

The mercaptan may be an alkyl mercaptan according to the formula $C_nH_{2n+1}SH$, and the value of n may be from 12 to 16 inclusive. The collector composition may comprise a mixture of alkyl mercaptans.

The emulsifying or wetting agent may be a glycol, and the glycol may be a polyglycol of the general formula (I):

$$R_1-(O-R_2)_m-OH \quad (I)$$

in which
 $R_1$ is phenyl, alkyl substituted phenyl, alkyl, hydrogen or a saturated heterocyclic group,
 $R_2$ is an alkylidene group;
 and the polyglycol has a molecular weight between 50 and 2000.

The polyglycol may have the general formula (II):

$$R_1-(O-R_3)_n-(O-R_4)_p-OH \quad (II)$$

in which
 $R_1$ is as defined in formula (I);
 $R_3$ is $-CH_2-CH_2-$;
 $R_4$ is

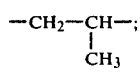

and
 n and p are both greater than 0, n and p both preferably being from 2 to 5 inclusive.

The polyglycol may thus be a polyethylene polypropylene glycol mono(4-alkyl-phenyl) ether of the formula (II) in which:
 $R_1$ is $R_5-C_6H_4-$ in which $R_5$ is a normal or branched alkyl group having 1 to 10 L carbon atoms and $-CH_6H_4-$ is a disubstituted benzene, or
the polyglycol may be a polyethylene polypropylene glycol ether of the formula (II) in which:
 $R_1$ is a normal or branched alkyl group having 1 to 12 carbon atoms.

Instead, the polyglycol may be a water soluble polyethylene glycol mono (4-alkylphenyl) ether of the formula (I) in which:

$R_1$ is $R_5-C_6H_4-$, $R_5$ being a normal or branched alkyl group having 1 to 10 carbon atoms and $-C_6H_4-$ being a disubstituted benzene; and
 $R_2$ is $-CH_2-CH_2-$, or
the polyglycol may be a polyethylene glycol alkyl ether of the formula (I) in which:
 $R_1$ is a normal or branched alkyl group having 1 to 12 carbon atoms; and
 $R_2$ is $-CH_2-CH_2-$.

Instead, the polyglycol may be a water soluble polyoxyethylene glycol of the formula (I) in which:
 $R_1$ is hydrogen; and
 $R_2$ is $-CH_2-CH_2-$, or
the polyglycol may be a water soluble polyoxypropylene glycol of the formula (I) in which:
 $R_1$ is hydrogen; and
 $R_2$ is

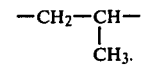

The polyglycol may have a molecular weight between 200 and 1000.

Further polyglycols contemplated by the inventor for use with mercaptans to form a premixed collector according to the invention comprise mixed polypropylene/polyethylene glycols of the type available from the Wyandotte Chemical Corporation as PLURONICS, or from Imperial Chemical Industries Limited as LISSAPOLS. These polyglycols can be described by the general formulae:

or

in which $R_1$ is as defined in formula (I) above.

The mixture of mercaptan and the emulsifying or wetting agent may comprise more than 50% of mercaptan on a volume basis, and preferably 70%–95% mercaptan on a volume basis, and more preferably 80%–90% mercaptan on a volume basis.

In the specification, when reference is made to classes of mercaptans, the reference is intended to include such class of mercaptans when of industrial purity or quality, i.e. including 85%–98% or more of the named class of mercaptan.

The invention will now be described, by way of example, with reference to the following non-limiting examples.

EXAMPLE 1

A 2 liter run of the mill scavenger feed sample of copper ore from the Palabora Mining Company Limited factory at Phalaborwa in the Northern Transvaal Province of South Africa was floated for 6 minutes in the laboratory at a pH of 8,3 in a WEMCO laboratory flotation cell using potassium amyl xanthate (PAX) as a collector at a concentration between 18 and 20 g/tonne. The scanvenger feed sample had previously been dosed in the rougher circuit with 1,1,3-triethoxy butane (TEB) frother at a concentration of 20 g/tonne and with froth stabilizer known as 41G and available from Hoechst South Africa (Proprietary) Limited at 30 g/tonne. A 39.8% copper recovery was achieved, the concentrate having a grade of 4.14%.

EXAMPLE 2

The procedure of Example 1 was followed, using the same sample and normal dodecyl mercaptan as a collector at a concentration of 18 g per tonne. A 44% copper recovery was achieved, the concentrate having a grade of 4.48%.

EXAMPLE 3

The procedure of Example 2 was repeated on the same sample using as a collector a mixture of normal dodecyl mercaptan and polyethylene glycol mono (4-alkylphenyl) ether, the ratio between mercaptan and polyglycol ether on a volume basis being 95:5. A 50.7% copper recovery was achieved, the concentrate being of a grade of 5.33%.

EXAMPLE 4

The procedure of Example 1 was repeated, with a different run of the mill Palabora scavenger feed sample from that used in Examples 1 to 3, the scavenger feed sample having also previously been dosed in the rougher circuit with TEB frother and 41G stabilizer at the same concentration as Example 1. The collector used was a mixture of normal dodecyl mercaptan and polyoxyethylene glycol in a ratio on a volume basis between mercaptan and polyglycol of 80:20. A 21.6% copper recovery was achieved, the concentrate being of a grade of 3.38%.

EXAMPLE 5

The procedure of Example 4 was repeated on the same sample, using potassium amyl xanthate as collector. The copper recovery achieved was 8%–10% and of a concentrate grade of 1.7%–1.94%.

EXAMPLE 6

The procedure of Example 4 was followed on the same sample using normal dodecyl mercaptan as collector. A copper recovery of 17%–19% was achieved, the concentrate being of a grade of 3.3%–3.5%.

Examples 1 to 6 show that the specified mixtures of polyglycol ether or polyglycol and mercaptan are superior to potassium amyl xanthate by itself, or to the mercaptan by itself.

EXAMPLE 7

Pure normal dodecyl mercaptan, potassium amyl xanthate (PAX) and various mixtures of normal dodecyl mercaptan and polyethylene glycol (4-alkylphenyl) ether in different proportions were subjected to comparative tests as collectors with various Palabora scavenger feed samples. As in the previous Examples, the Palabora scavenger feed samples were run of the mill samples, which had been previously dosed with TEB frother and 41G stabilizer at the same concentrations as Example 1. The polyethylene glycol mono(4-alkylphenyl) ether used, as was the case for Examples 1–6, comprised a commercially available mixture of closely related polyglycols. The procedure of Example 1 was used and the dosage of collector in g/tonne was kept constant. The results are set out in the following table, Table 1.

TABLE 1

| SAMPLE NUMBER | COLLECTOR (VOLUME BASIS) | | ASSAY CONCEN-TRATE (%) | COPPER RECOVERY (%) |
|---|---|---|---|---|
| | Volume Normal dodecyl mercaptan | Volume polyglycol | | |
| 1. | 95 | 5 | 5,33 | 50,7 |
| | 90 | 10 | 5,10 | 50,1 |
| | 85 | 15 | 5,48 | 45,2 |
| | 80 | 20 | 4,89 | 42,0 |
| | Pure dodecyl mercaptan | | 4,48 | 44,0 |
| | Potassium amyl xanthate | | 4,14 | 39,8 |
| 2. | 95 | 5 | 5,44 | 49,4 |
| | 90 | 10 | 4,43 | 52,6 |
| | 85 | 15 | 4,45 | 45,0 |
| | 80 | 20 | 4,90 | 49,5 |
| | Pure dodecyl mercaptan | | 5,44 | 47,5 |
| | Potassium amyl xanthate | | 4,09 | 36,6 |
| 3. | 95 | 5 | 3,52 | 38,6 |
| | 90 | 10 | 3,59 | 36,8 |
| | 85 | 15 | 3,52 | 38,5 |
| | 80 | 20 | 3,17 | 36,1 |
| | Pure dodecyl mercaptan | | 3,79 | 36,5 |
| | Potassium amyl xanthate | | 2,08 | 26,6 |
| 4. | 95 | 5 | 3,55 | 38,8 |
| | 90 | 10 | 3,41 | 37,8 |
| | 85 | 15 | 3,45 | 38,1 |
| | 80 | 20 | 4,15 | 36,5 |
| | Pure dodecyl mercaptan | | 3,78 | 41,7 |
| | Potassium amyl xanthate | | 2,45 | 23,6 |

In general, the results of Example 7 show that use of a collector comprising a premix of the mercaptan and the polyglycol leads to better selectivity and better recovery when compared with pure dodecyl mercaptan, and in particular when compared with PAX.

EXAMPLE 8

Various mixtures of normal dodecyl mercaptan and polypropylene glycol having an average molecular weight of 425 were tested as collectors with various run of the mill Palabora scavenger feed samples, in accordance with the procedure of Example 7, and were compared with potassium amyl xanthate and pure normal dodecyl mercaptan. In each case the weight of collector added was the same. The results are set out in the following Table, Table 2.

TABLE 2

| SAMPLE NUMBER | COLLECTOR (VOLUME BASIS) | | ASSAYS (%) | | | COPPER RECOVERY (%) |
|---|---|---|---|---|---|---|
| | Volume Normal dodecyl mercaptan | Volume polyglycol | HEADS | CONCEN-TRATE | TAILS | |
| 1 | 90 | 10 | 0,1178 | 2,70 | 0,097 | 18,3 |
| | 80 | 20 | 0,1220 | 2,88 | 0,097 | 21,2 |
| | 70 | 30 | 0,1179 | 3,09 | 0,097 | 18,3 |
| | 60 | 40 | 0,1277 | 3,88 | 0,105 | 18,3 |
| | 50 | 50 | 0,1266 | 3,47 | 0,103 | 19,2 |
| | Pure dodecyl mercaptan | | 0,1205 | 3,51 | 0,100 | 17,5 |
| | Potassium amyl xanthate | | 0,1205 | 1,70 | 0,111 | 8,5 |

TABLE 2-continued

| SAMPLE NUMBER | COLLECTOR (VOLUME BASIS) | | ASSAYS (%) | | | COPPER RECOVERY (%) |
|---|---|---|---|---|---|---|
| | Volume Normal dodecyl mercaptan | Volume polyglycol | HEADS | CONCEN-TRATE | TAILS | |
| 2 | 90 | 10 | 0,1282 | 3,00 | 0,105 | 18,7 |
| | 80 | 20 | 0,1252 | 3,38 | 0,099 | 21,6 |
| | 70 | 30 | 0,1185 | 2,88 | 0,099 | 17,1 |
| | 60 | 40 | 0,1233 | 3,82 | 0,101 | 18,6 |
| | 50 | 50 | 0,1283 | 3,00 | 0,111 | 14,0 |
| | Pure dodecyl mercaptan | | 0,1228 | 3,36 | 0,100 | 19,1 |
| | Potassium amyl xanthate | | 0,1190 | 1,94 | 0,108 | 9,8 |

As with Example 7, the best selectivities and recoveries were obtained with the premixed mercaptan/glycol collectors, rather than the pure mercaptan or PAX.

EXAMPLE 9

The procedure of Example 8 was repeated at a constant dosage by weight of collectors comprising mixtures of normal dodecyl mercaptan and alkyl($C_8$) phenyl decaethylene glycol ether of the formula:

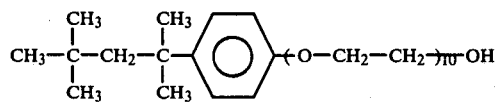

and commercially available from the Rohm & Haas Company as TRITON X-100.

TABLE 3

| SAMPLE NUMBER | COLLECTOR (VOLUME BASIS) | | ASSAYS (%) | | | COPPER RECOVERY (%) |
|---|---|---|---|---|---|---|
| | Volume Normal dodecyl mercaptan | Volume polyglycol | HEADS | CONCEN-TRATE | TAILS | |
| 1. | Pure Potassium amyl xanthate | | 0,1247 | 4,14 | 0,076 | 39,8 |
| | Pure dodecyl mercaptan | | 0,1322 | 4,48 | 0,075 | 44,0 |
| | 95 | 5 | 0,1262 | 5,33 | 0,063 | 50,7 |
| | 90 | 10 | 0,1324 | 5,10 | 0,067 | 50,1 |
| | 85 | 15 | 0,1335 | 5,48 | 0,074 | 45,2 |
| | 80 | 20 | 0,1280 | 4,89 | 0,075 | 42,0 |
| 2. | Pure Potassium amyl xanthate | | 0,1341 | 4,09 | 0,086 | 36,6 |
| | Pure dodecyl mercaptan | | 0,1374 | 5,44 | 0,073 | 47,5 |
| | 95 | 5, | 0,1347 | 5,54 | 0,069 | 49,4 |
| | 90 | 10 | 0,1349 | 4,43 | 0,065 | 52,6 |
| | 85 | 15 | 0,1186 | 4,45 | 0,066 | 45,0 |
| | 80 | 20 | 0,1288 | 4,90 | 0,066 | 49,5 |
| 3. | Pure Potassium amyl xanthate | | 0,0782 | 2,08 | 0,058 | 26,6 |
| | Pure dodecyl mercaptan | | 0,0829 | 3,79 | 0,053 | 36,5 |
| | 95 | 5 | 0,0822 | 3,52 | 0,051 | 38,6 |
| | 90 | 10 | 0,0878 | 3,59 | 0,056 | 36,8 |
| | 85 | 15 | 0,0822 | 3,52 | 0,051 | 38,5 |
| | 80 | 20 | 0,0790 | 3,17 | 0,051 | 36,1 |
| 4. | Pure potassium amyl xanthate | | 0,0831 | 2,45 | 0,064 | 23,6 |
| | Pure dodecyl mercaptan | | 0,0816 | 3,78 | 0,048 | 41.7 |
| | 95 | 5 | 0,0825 | 3,55 | 0,051 | 38,8 |
| | 90 | 10 | 0,0812 | 3,41 | 0,051 | 38,8 |
| | 85 | 15 | 0,0816 | 3,45 | 0,051 | 38,1 |
| | 80 | 20 | 0,0797 | 4,15 | 0,051 | 36,5 |

Example 9 also shows that in general, by using a premixed collector according to the invention comprising a mercaptan/polyglycol mixture, a comparable or better selectivity and/or recovery can be obtained than by using pure normal dodecyl mercaptan or pure potassium amyl xanthate.

EXAMPLE 10

The procedure of Examples 7 to 9 was repeated on various further Palabora scavenger feed samples, at a constant dosage by weight of collector of 9 g/tonne, using as collectors mixtures of normal dodecyl mercaptan and various polypropylene glycols and FLOTANOL C-7 a polyglyco composition commercially available from Hoechst South Africa (Proprietary) Limited. These tests are set out in the following table, Table 4, together with comparative results for pure dodecyl mercaptan and PAX. The PAX was dosed at 35 g/tonne. In certain of the tests additional frother was added at a dosage of 4 g/tonne where necessary, to counteract froth suppression caused by the normal dodecyl mercaptan. In Table 4, the average molecular weight of the glycol is indicated for the glycols other than FLOTANOL, and in each case the proportion by volume of the dodecyl mercaptan to the glycol was 4:1.

TABLE 4

| Sample | Collector (molecular weight) | Additional frother added to counteract froth suppression by the mercaptan where necessary | Assay Heads (%) | Copper Recovery (%) |
|---|---|---|---|---|
| 1 | Pure normal dodecyl mercaptan | FLOTANOL C-7 | 2,21 | 33,9 |
|   | Mercaptan/FLOTANOL C-7 | FLOTANOL C-7 | 2,05 | 34,1 |
|   | Pure normal dodecyl mercaptan | Polypropylene glycol (400) | 1,72 | 30,9 |
|   | Mercaptan/polypropylene glycol (400) | Polypropylene glycol (400) | 1,37 | 34,6 |
| 2 | Pure potassium amyl xanthate | — | 0,98 | 22,3 |
|   | Pure dodecyl mercaptan | — | 1,06 | 27,8 |
| 3 | Mercaptan/polypropylene glycol (425) | — | 1,17 | 28,8 |
|   | Mercaptan/polypropylene glycol (1200) | — | 1,25 | 26,7 |
|   | Mercaptan/polypropylene glycol (2000) | — | 1,12 | 28,8 |

The results of Example 10 again show that collectors according to the invention give comparable or better recoveries than PAX or pure dodecyl mercaptan.

EXAMPLE 11

The procedure of Example 10 using the same dosages and ratios, was repeated using TRITON X-100, on a run of the mill Palabora scavenger feed sample. The TRITON X-100 was used as additional frother at 4 g/tonne. Results are set out in Table 5.

TABLE 5

| Collector | Additional Frother | Assay Heads (%) | Copper Recovery (%) |
|---|---|---|---|
| Pure dodecyl mercaptan | TRITON X-100 | 1,72 | 30,4 |
| Dodecyl mercaptan/ TRITON X-100 | TRITON X-100 | 1,71 | 31,6 |

A better recovery was achieved with the dodecyl mercaptan/TRITON X-100 premix than with the mercaptan itself.

EXAMPLE 12

The procedure of Examples 10 and 11 was repeated using, as the polyglycols, monoalkyl(phenyl) ethyleneglycol ethers, and using the frother commercially available from Dow Chemical Company as DOWFROTH 1012 as additional frother at 4 g/tonne where necessary, on a run of the mill Palabora scavenger feed sample. In each case the volume ratio of the dodecyl mercaptan to polyglycol in the mixed collectors was 4:1. The results are set out in Table 6.

TABLE 6

| Collector | Additional Frother | Assay Heads (%) | Copper Recovery (%) |
|---|---|---|---|
| Pure Potassium Amyl xanthate | — | 0,98 | 22,3 |
| Pure dodecyl mercaptan | — | 1,06 | 27,8 |
| Mercaptan/Phenyl ethylene glycol ether | DOWFROTH 1012 | 1,14 | 26,2 |
| Mercaptan/Mono-isopropylene glycol ether | — | 1,16 | 25,9 |
| Mercaptan/tri-ethylene glycol ether | — | 1,04 | 28,4 |
| Mercaptan/mono-butyl ethylene glycol ether | — | 1,11 | 29,3 |

Comparable or better results were achieved with the mercaptan/polyglycol premixed collectors, when compared with PAX and pure mercaptan.

EXAMPLE 13

Further tests in accordance with Example 1 on run of the mill Palabora scavenger feed samples were conducted with cell loadings of about 2 Kg. In each case the flotation time was 6 minutes, and the pulp had a pH of 8.3. The scavenger feed samples had previously been dosed in the rougher circuit with TEB frother and 41G stabilizer at the dosages of Example 1. In this Example PAX is compared with normal dodecyl mercaptan, and with a mixture of the dodecyl mercaptan and FLOTANOL C-7. The results are set out hereunder in Table 7. TEB was used as additional frother where necessary. The mercaptan to FLOTANOL C-7 ratio by volume in the premixed collector was 4:1 and the dosages of the collector and additional frother are indicated in the table in g/tonne.

TABLE 7

| Cell Load | Collector (g/tonne) | Additional Frother (g/tonne) | Assay (%) Heads | Assay (%) Conc. | Assay (%) Tails | Copper Recovery (%) |
|---|---|---|---|---|---|---|
| 2,135 | PAX (10) | TEB (6) | 0,136 | 2,94 | 0,096 | 30,4 |
| 1,996 | Pure dodecyl mercaptan (9) | TEB (9) | 0,134 | 3,10 | 0,077 | 43,7 |
| 1,943 | Dodecyl mercaptan/ | — | 0,133 | 3,82 | 0,078 | 42,3 |

TABLE 7-continued

| Cell Load | Collector (g/tonne) | Additional Frother (g/tonne) | Assay (%) Heads | Conc. | Tails | Copper Recovery (%) |
|---|---|---|---|---|---|---|
| | FLOTANOL C-7 (9) | | | | | |

In this Example a better selectivity, with comparable recovery, was achieved with the mercaptan/- tor and additional frother dosages are indicated in the Table.

TABLE 8

| Cell Load Kg. | Collector (molecular weight of polypropylene glycol) (g/tonne) | Additional Frother (g/tonne) | Assay (%) Heads | Conc. | Tails | Copper Recovery (%) |
|---|---|---|---|---|---|---|
| 2,078 | PAX (10) | TEB (6) | 0,130 | 2,41 | 0,084 | 36,8 |
| 2,047 | Normal dodecyl mercaptan (9) | TEB (9) | 0,134 | 3,66 | 0,079 | 42,0 |
| 2,029 | Dodecyl mercaptan/ polypropylene glycol (425) (9) | TEB (3) | 0,130 | 3,05 | 0,080 | 39,7 |
| 2,024 | Dodecyl mercaptan/ polypropylene glycol (1025) (9) | TEB (3) | 0,131 | 2,77 | 0,075 | 43,8 |
| 2,132 | Dodecyl mercaptan/ polypropylene glycol (1200) (9) | TEB (3) | 0,137 | 2,50 | 0,090 | 35,7 |
| 2,111 | Dodecyl mercaptan/ polypropylene glycol (2000) (9) | TEB (3) | 0,134 | 2,78 | 0,084 | 38,9 |
| 2,123 | Dodecyl mercaptan/ polypropylene glycol (2025) (9) | TEB (3) | 0,131 | 2,22 | 0,085 | 36,6 |

FLOTANOL C-7 premix than with pure mercaptan.

EXAMPLE 14

The procedure of Example 13 was followed, PAX and normal dodecyl mercaptan being compared with mixtures of the dodecyl mercaptan and polypropylene glycol of the formula:

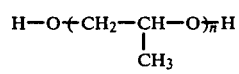

The results are set out in the following Table, Table 8, in which the molecular weight of the polypropylene glycol is indicated. In each case where a premixed collector of mercaptan and polyglycol was used, the volume ratio of mercaptan to glycol was 4:1 and the collec- In this Example the concentrations and recoveries of the premixed collectors according to the invention were shown to be comparable with pure dodecyl mercaptan.

EXAMPLE 15

The procedure of Example 14 was followed, PAX and normal dodecyl mercaptan as collectors being compared with various mixtures of the dodecyl mercaptan and alkyl polypropylene glycols of the general formula:

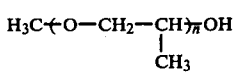

available from the Dow Chemical Company under the trade name DOWFROTH. The results are set out in Table 9 below.

TABLE 9

| Cell Load Kg. | Collector | Additional Frother (g/tonne) | Assay (%) Heads | Conc. | Tails | Copper Recovery |
|---|---|---|---|---|---|---|
| 1,980 | PAX (10) | TEB (6) | 0,128 | 2,44 | 0,086 | 33,9 |
| 2,178 | Dodecyl mercaptan (9) | TEB (9) | 0,134 | 2,40 | 0,078 | 43,2 |
| 2,183 | Dodecyl mercaptan/ DOWFROTH-200 | — | 0,133 | 2,67 | 0,082 | 39,5 |
| 2,084 | Dodecyl mercaptan/ DOWFROTH-250 (9) | — | 0,129 | 2,02 | 0,082 | 38,0 |
| 2,115 | Dodecyl mercaptan/ DOWFROTH-1012 | | | | | |

TABLE 9-continued

| Cell Load Kg. | Collector | Additional Frother (g/tonne) | Assay (%) Heads | Conc. | Tails | Copper Recovery |
|---|---|---|---|---|---|---|
| | (9) | — | 0,129 | 2,26 | 0,076 | 42,7 |

In this Example the premixed collectors according to the invention were shown to be comparable to pure dodecyl mercaptan.

with a polypropylene glycol having a molecular weight of 425. The results are set out in the following table, Table 11, the volume ratio of mercaptan to polyglycol being 4:1.

TABLE 11

| Cell Load | Collector (g/tonne) | Additional Frother (g/tonne) | Assay (%) Heads | Conc. | Tails | Copper Recovery (%) |
|---|---|---|---|---|---|---|
| 2,029 | Pure PAX (10) | TEB (6) | 0,0730 | 0,79 | 0,05 | 23,8 |
| 2,083 | Pure $C_{12}$-SH (9) | TEB (9) | 0,0695 | 0,99 | 0,044 | 38,4 |
| 1,940 | $C_{12}$-SH/ Polypropylene glycol (9) | TEB (3) | 0,0749 | 1,32 | 0,043 | 44,0 |
| 2,076 | Pure $C_{11}$-SH(9) | TEB (9) | 0,0674 | 1,23 | 0,046 | 33,0 |
| 2,042 | $C_{11}$-SH/ polypropylene glycol (9) | — | 0,0730 | 1,24 | 0,046 | 38,5 |
| 2,040 | Pure $C_{13}$-SH (9) | TEB (9) | 0,0744 | 1,19 | 0,046 | 36,9 |
| 1,970 | $C_{13}$-SH/polypropylene glycol (9) | — | 0,0746 | 1,28 | 0,048 | 41,2 |
| 2,059 | Pure $C_{14}$-SH (9) | TEB (9) | 0,0739 | 1,21 | 0,045 | 39,2 |
| 1,972 | $C_{14}$-SH/poly propylene glycol (9) | — | 0,0739 | 1,23 | 0,046 | 39,2 |
| 1,944 | Pure $C_{16}$-SH (9) | TEB (9) | 0,0719 | 1,32 | 0,043 | 41,6 |
| 1,960 | $C_{16}$-SH/ polypropylene glycol (9) | — | 0,0734 | 1,31 | 0,043 | 42,8 |

EXAMPLE 16

The procedure of Example 15 was repeated, using TRITON X-100 as the polyglycol. As indicated in Example 9, TRITON X-100 is a commercial grade octyl phenyl decaethylene glycol ether, and Table 10, which sets out the results of this Example hereunder, includes a comparative test with another commercial octyl phenyl decaethylene glycol ether. In these tests the premixed collectors comprised the dodecyl mercaptan and polyglycol in a ratio of 95:5 by volume.

TABLE 10

| Cell Load kg. | Collector (g/tonne) | Additional Frother (g/tonne) | Assay Heads | Conc. | Tails | Copper Recovery (%) |
|---|---|---|---|---|---|---|
| 2,156 | PAX (10) | TEB (6) | 0,126 | 2,10 | 0,085 | 33,9 |
| 1,923 | Normal dodecyl mercaptan (9) | TEB (9) | 0,129 | 2,34 | 0,071 | 46,3 |
| 2,086 | Dodecyl mercaptan/ TRITON X-100 (9) | TEB (6) | 0,131 | 2,48 | 0,076 | 43,4 |
| 2,059 | Dodecyl mercaptan/ other commercial octyl phenyl decaethylene glycol ether (9) | — | 0,127 | 2,20 | 0,079 | 39,3 |

In this Example the recoveries and concentrations achieved by the premixed collectors according to the invention were found to be comparable to pure dodecyl mercaptan.

EXAMPLE 17

The procedure of Example 15 was repeated and PAX and pure dodecyl mercaptan were compared as collectors with mixtures of various normal alkyl mercaptans with a polypropylene glycol having a molecular weight of 425. The results are set out in the following table, Table 11, the volume ratio of mercaptan to polyglycol being 4:1.

This Example serves to show that the recoveries and concentrations achieved for other alkyl mercaptans mixed with polyglycols according to the invention are similar to those achieved when using dodecyl mercaptan.

EXAMPLE 18

Laboratory froth flotation tests were carried out on various copper ore samples from different sources. The tests were carried out in a WEMCO laboratory flotation cell with the pulp at a pH of 8.3 On each sample two laboratory flotations were performed of 5 minutes each, a primary flotation wherein potassium amyl xanthate was used as collector, and a secondary flotation also for 5 minutes. In the secondary flotations potassium amyl xanthate was compared with pure dodecyl mercaptan and a mixture of the dodecyl mercaptan and polypropylene glycol having an average molecular weight of 400, the mixture of the mercaptan and glycol being 4:1 on a volume basis. All the samples were ground for 10 minutes in a laboratory rod mill prior to the flotation. The results of Example 18 show that the premixed mercaptan/polyglycol collectors according to the invention are effective for ores from various sources.

with tetrahydrofurfuryl alcohol polyethylene glycol ether of the formula

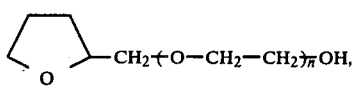

TABLE 12

| Sample Origin | Cell Loading Kg. | Collector (g/tonne) | Additional Frother (g/tonne) | Assay (%) Heads | Assay (%) Conc. | Assay (%) Tails | Recovery (%) |
|---|---|---|---|---|---|---|---|
| O'Kiep Mining Co. | 0,9861 | Primary-PAX (20) Secondary-PAX (20) | TEB (12) TEB (12) | 2,237 | 1,932 2,77 | 0,257 | 86,2 3,9 90,1 |
| O'Kiep | 0,9884 | Primary-PAX (20) Secondary-pure dodecyl mercaptan (18) | TEB (12) TEB (18) | 2,228 | 17,89 2,56 | 0,242 | 86,0 4,7 90,7 |
| O'Kiep Mining Co. | 0,9885 | Primary-PAX (20) Secondary-dodecyl mercaptan/polypropylene glycol (18) | TEB (12) — | 2,074 | 17,89 2,46 | 0,215 | 86,4 4,7 91,1 |
| Messina Mining Co. | 0,9870 | Primary-PAX (20) Secondary-PAX(20) | TEB (12) TEB (12) | 1,456 | 28,20 2,86 | 0,056 | 94,2 2,2 96,4 |
| Messina Mining Co. | 1,000 | Primary-PAX (20) Secondary-dodecyl mercaptan/polypropylene glycol (18) | TEB (12) — | 1,493 | 27,86 1,51 | 0,055 | 94,7 1,8 96,5 |
| Palabora Mining Co. | 0,9859 | Primary-PAX (20) Secondary-PAX(20) | TEB (12) — | 0,460 | 13,00 5,22 | 0,079 | 70,7 12,8 83,5 |
| Palabora Mining Co. | 0,9870 | Primary-PAX (20) Secondary-Pure dodecyl mercaptan (18) | TEB (12) TEB (18) | 0,446 | 12,94 3,38 | 0,060 | 72,9 14.3 87,2 |
| Palabora Mining Co. | 0,9900 | Primary-PAX (20) Secondary-Dodecyl mercaptan/ polypropylene glycol (18) | TEB (12) — | 0,422 | 10,22 3,16 | 0,062 | 74,4 11.6 86.0 |

EXAMPLE 19

Further laboratory froth flotation tests were carried out using the WEMCO cell at a pH of 8,3, at a flotation time of 6 minutes and using Palabora Mining Company run of the mill scavenger feed, which had been previously dosed with TEB collector and 41G stabilizer at the dosages given in Example 1. Potassium amyl xanthate and normal dodecyl mercaptan were compared with mixtures of the dodecyl mercaptan respectively with ethylene glycol monoethyl ether and polyethylene glycol monolaurate. In each case the mercaptan and glycol were mixed in a volume ratio of 4:1. The test results are set out in the following table, Table 13.

TABLE 13

| Cell Loading kg. | Collector (g/tonne) | Frother (g/tonne) | Assay (%) Heads | Assay (%) Conc. | Assay (%) Tails | Recovery (%) |
|---|---|---|---|---|---|---|
| 1,977 | PAX (10) | TEB (6) | 0,850 | 1,22 | 0,061 | 30,1 |
| 2,064 | Pure dodecyl mercaptan (9) | TEB (9) | 0,0891 | 1,80 | 0,055 | 39,5 |
| 2,002 | Dodecyl mercaptan/tetrahydrofurfuryl alcohol polyethylene ether (9) | TEB (3) | 0,0874 | 1,70 | 0,055 | 38,4 |
| 2,008 | Dodecyl mercaptan/ diethylene glycol monoethyl ether (9) | TEB (3) | 0,0855 | 1,52 | 0,056 | 35,9 |
| 2,114 | Dodecyl mercaptan/ Polyethylene glycol monolaurate (9) | — | 0,0837 | 1,42 | 0,052 | 39,3 |

Example 19 illustrates further examples of mercaptan/polyglycol premixed collectors according to the invention which are effective.

EXAMPLE 20

Laboratory tests were carried out with Palabora run of the mill scavenger feed in a WEMCO laboratory cell for a flotation time of 6 minutes at a pH of 8.3. In these tests potassium amyl xanthate as collector was compared with pure normal dodecyl mercaptan and a mixture of the dodecyl mercaptan and polypropylene glycol having an average molecular weight of 400. The results are set out in the following table, Table 14. Where necessary to counteract froth suspension, the polypropylene glycol was used as additional frother, so that the effectiveness of the mercaptan/polyglycol premixed collector could be compared with the effectiveness of the same dosages of mercaptan and polyglycol added separately.

TABLE 14

| Cell Loading kg. | Collector (g/tonne) | Additional Frother (g/tonne) | Assay (%) Heads | Conc. | Tails | Recovery (%) |
|---|---|---|---|---|---|---|
| 1,907 | PAX (10) | — | 0,0873 | 1,28 | 0,075 | 15,0 |
| 1,818 | PAX (10) | Polypropylene glycol (3) | 0,0872 | 1,11 | 0,077 | 12,6 |
| 1,912 | Pure dodecyl mercaptan (9) | — | 0,0831 | 1,85 | 0,065 | 22,6 |
| 1,891 | Pure dodecyl mercaptan (9) | Polypropylene glycol (3) | 0,0838 | 1,89 | 0,064 | 24,5 |
| 1,902 | Dodecyl mercaptan/polypropylene glycol at a weight ratio of 3:1 premixed (12) | — | 0,0847 | 1,60 | 0,064 | 26,4 |

EXAMPLE 21

The procedure of Example 20 was repeated on another run of the mill Palabora scavenger feed sample, using, as the polyglycol, FLOTANOL C-7. The results are set out hereunder in Table 15.

TABLE 15

| Cell Loading Kg. | Collector (g/tonne) | Additional Frother (g/tonne) | Assay (%) Heads | Conc. | Tails | Recovery (%) |
|---|---|---|---|---|---|---|
| 2,133 | PAX (10) | — | 0,0799 | 1,57 | 0,060 | 25,9 |
| 2,049 | PAX (10) | FLOTANOL C-7 (3) | 0,0787 | 1,47 | 0,058 | 27,4 |
| 2,106 | Pure dodecyl mercaptan (9) | — | 0,0774 | 1,78 | 0,048 | 39,1 |
| 2,107 | Pure dodecyl mercaptan (9) | FLOTANOL C-7 (3) | 0,0758 | 1,93 | 0,045 | 41,6 |
| 2,088 | Dodecyl mercaptan/ FLOTANOL C-7 at a weight ratio of 3:1 (12) | — | 0,0770 | 1,65 | 0,045 | 42,7 |

EXAMPLE 22

The procedure of Examples 20 and 21 was repeated on another run of the mill Palabora scavenger feed sample, using, as the polyglycol, DOWFROTH 1012. The results are set out hereunder in Table 16.

TABLE 16

| Cell Loading Kg. | Collector (g/tonne) | Additional Frother (g/tonne) | Assay Heads | Conc. | Tails | Recovery (%) |
|---|---|---|---|---|---|---|
| 2,143 | PAX (10) | — | 0,0774 | 1,40 | 0,058 | 26,1 |
| 2,173 | PAX (10) | DOWFROTH 1012 (3) | 0,0765 | 1,35 | 0,055 | 29,3 |
| 2,077 | Pure dodecyl mercaptan (9) | — | 0,0781 | 1,80 | 0,049 | 38,3 |
| 2,081 | Pure dodecyl mercaptan (9) | DOWFROTH 1012 (3) | 0,0771 | 1,38 | 0,046 | 40,0 |
| 2,101 | Dodecyl mercaptan/ DOWFROTH 1012 at a weight ratio of 3:1 premixed (12) | — | 0,0789 | 1,50 | 0,046 | 43,1 |

Examples 20 to 22 demonstrate the importance of premixing the polyglycol and mercaptan to achieve a better recovery by better dispersing the mercaptan in the pulp, when compared with adding the polyglycol separately. These examples demonstrate that it is not merely the frothing ability of the polyglycol which improves recovery, as there appears to be synergism in that the mercaptan/polyglycol premixed collectors achieve a greater recovery than the use of the mercaptan collector and polyglycols separately in the same quantities. Furthermore, in Example 20 addition of the additional frother where PAX was used as collector also shows that it is not merely the frothing ability of the polyglycol which improves recovery in general for any collector, as in the case of PAX as collector in Example 20 the addition of the polyglycol led to suppression of the froth with a drop in recovery from 15% to 12.6%.

The invention has as an advantage, the fact that improved dispersion of the mercaptan in the aqueous pulp takes place with improved mineral recovery and increased mineral grade, i.e. improved selectivity. Furthermore, suppression of froth caused by the mercaptan is substantially reduced.

Further advantages are that, because the polyglycol is a less expensive substance than the mercaptan, the process is less expensive, while at the same time resulting in increased recovery of copper. Also, because the normal froth suppression caused by the mercaptan is eliminated or at least reduced, operational procedures in the plant are simplified.

In this regard, in plant scale production runs, it had been found in the prior art when using pure alkyl mercaptan as collector and TEB as frother, that (in addition to the froth suppression caused by the mercaptan) the first cell of the circuit where the mercaptan was added achieved little or no flotation, the cell thus acting merely as a conditioning cell, used to disperse the mercaptan into the pulp. However, by premixing a minor proportion of the polyglycol into the mercaptan prior to dosing, dispersion of the mercaptan into the pulp took place sufficiently rapidly for froth recovery to take place in the cell, leading to efficient plant utilization.

With regard to the application of the invention in the plant it should be noted that it is impossible to predict beforehand exactly which polyglycol and which ratio of mercaptan to polyglycol in the collector, and which dosage, will be best for a particular ore. Thus, as is common practice in the art, pilot plant runs will be in practice be conducted to determine the best polyglycol, the best ratio in the premix, and the best dosage. These values will also, in practice, be varied from time to time to take into account variations in the ore being processed. The Examples above however do indicate that mercaptans can be strikingly good collectors whose effectivenss is unexpectedly and synergistically improved by premixing with a minor proportion by volume of polyglycol. The Examples also show that in general, there is always a premix mercaptan/polyglycol ratio which leads to an improved recovery and/or selectivity when compared with pure mercaptan. In this regard it should further be noted that "pure" as used with regard to mercaptans in the Examples, does not mean that the mercaptans were analytically pure. They were in fact commercial grade mercaptans as defined above, but were "pure" in that they were not premixed with anything else. Alkyl mercaptans having 12 to 16 carbon atoms are preferred as they are liquids and have tolerable odours compared with shorter chain mercaptans, and it is contemplated that normal dodecyl mercaptan will generally be used as it is readily commercially available. However, if other alkyl mercaptans or mixtures thereof of acceptable odour are readily available at competitive prices, they can equally easily be used.

I claim:

1. In the method for the recovery of copper values by froth flotation from copper ores wherein an alkyl mercaptan having the formula $C_nH_{2n+1}$—SH wherein n is an integer of from 12 to 16 is used as a collector, the improvement which includes the step of, prior to addition of the mercaptan collector to the copper ore pulp, thoroughly mixing said mercaptan with a polyglycol selected from the following:
   (a) a polyglycol having the general formula:
      (I) $R_1$—$(OR_2)_m$—OH in which $R_1$ is selected from the group consisting of phenyl, alkyl substituted phenyl, alkyl, hydrogen and a saturated heterocyclic group, $R_2$ is an alkylidene group, m is an integer of at least 2 and said polyglycol has a molecular weight between 50 and 2000; and
   (b) a polyglycol having the general formula:
      (II) $R_1$—$(OR_3)_n$—$(OR_4)_p$—OH in which $R_1$ is as defined for formula I herein, $R_3$ is —$CH_2CH_2$—, $R_4$ is

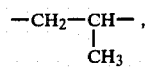

and n and p are integers ranging from 2 to 5, and the mixture containing greater than 50 percent by volume of said mercaptan.

2. A method as claimed in claim 1, in which the copper values recovered are selected from the group consisting of oxides and sulphides.

3. A method as claimed in claim 1, in which the mercaptan collector is used together with another collector selected from the group consisting of xanthates, mercaptobenzothiazoles, dithiocarbamates, thionocarbamates and dithiophosphates.

4. A method as claimed in claim 3, in which the other collector is a xanthate, the ratio on a weight basis between the mercaptan and the xanthate being between 8:3 and 8:4.

5. A method as claimed in claim 4, in which the froth flotation is carried out in a plurality of stages, the mixture of mercaptan and polyglycol being added to the pulp in several of the stages.

6. A method as claimed in claim 3, in which the froth flotation is carried out in a plurality of stages, the mixture of the mercaptan and polyglycol being first added to the pulp in a stage downstream of the stage in which the other collector is first added to the pulp.

7. A method as claimed in claim 1, in which between 0.01 and 0.5 kg of mercaptan is used for each ton of ore processed.

8. In the method of claim 1, said polyglycol being a polyethylene polypropylene glycol mono(4-alkylphenyl)ether of the formula II in which $R_1$ is $R_5$—$C_6H_4$— where $R_5$ is a normal or branched alkyl group having 1 to 10 carbon atoms, —$C_6H_4$— is a disubstituted benzene and n and p are both from 2 to 5 inclusive.

9. In the method of claim 1, said polyglycol being a polyethylene polypropylene glycol ether of the formula II where $R_1$ is a normal or branched alkyl group having 1 to 12 carbon atoms and n and p are both from 2 to 5 inclusive.

10. In the method of claim 1, said polyglycol being a water soluble polyethylene glycol mono(4-alkyl-phenyl)ether of the formula I where $R_1$ is $R_5$—$C_6H_4$—, $R_5$ being a normal or branched alkyl group having 1 to 10 carbon atoms, and —$C_6H_4$— being a disbustituted benzene, and $R_2$ is —$CH_2$—$CH_2$—.

11. In the method of claim 1, said polyglycol being a polyethylene glycol alkyl ether of the formula I where $R_1$ is a normal or branched alkyl group having 1 to 12 carbon atoms, and $R_2$ is —$CH_2$—$CH_2$—.

12. In the method of claim 1, said polyglycol being a water soluble polyoxyethylene glycol of the formula I where $R_1$ is hydrogen and $R_2$ is —$CH_2$—$CH_2$—.

13. In the method of claim 1, said polyglycol being a water soluble polyoxypropylene glycol of the formula I where $R_1$ is hydrogen and $R_2$ is

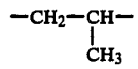

14. In the method of claim 1, said mercaptan collector being present in the mixture of mercaptan and polyglycol in an amount ranging from greater than 70 up to about 95% based on the volume of said mixture.

15. A collector composition for use in a froth flotation process, said composition comprising a mixture of an alkyl mercaptan having the formula $C_nH_{2n+1}$—SH wherein n is an integer of from 12 to 16 and a polyglycol, said polyglycol selected from the group consisting of
(a) a polyglycol having the general formula:
(I) $R_1$—$(OR_2)_m$—OH in which $R_1$ is selected from the group consisting of phenyl, alkyl substituted phenyl, alkyl, hydrogen and a saturated heterocyclic group, $R_2$ is an alkylidene group, m is an integer of at least 2 and said polyglycol has a molecular weight between 50 and 2000, and
(b) a polyglycol having the general formula:
(II) $R_1$—$(OR_3)_n$—$(OR_4)_p$—OH in which $R_1$ is as defined for formula I herein, $R_3$ is —CH—$CH_2$—, $R_4$ is

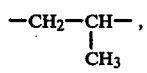

n and p are integers of from 2 to 5, said mercaptan being present in the mixture in an amount ranging from greater than 50 up to about 95 percent based on the volume of said mixture.

16. A collector composition as claimed in claim 15, in which the mercaptan and the polyglycol are soluble in each other, the composition being in the form of a solution of the components thereof in each other.

17. A collector composition as claimed in claim 15, which comprises a mixture of said alkyl mercaptans.

18. A collector composition as claimed in claim 15, in which the polyglycol is a polyethylene polypropylene glycol mono(4-alkyl-phenyl)ether of the formula (II) in which:
$R_1$ is $R_5$—$C_6H_4$— in which $R_5$ is a normal or branched alkyl group having 1 to 10 carbon atoms and —$C_6H_4$— is a disubstituted benzene.

19. A collector composition as claimed in claim 15, in which the polyglycol is a polyethylene polypropylene glycol ether of the formula (II) in which:
$R_1$ is a normal or branched alkyl group having 1 to 12 carbon atoms.

20. A collector composition as claimed in claim 15, in which the polyglycol is a water soluble polyethylene glycol mono (4-alkylphenyl) ether of the formula (I) in which:
$R_1$ is $R_5$—$C_6H_4$—, $R_5$ being a normal or branched alkyl group having 1 to 10 carbon atoms and —$C_6H_4$— being a disubstituted benzene; and
$R_2$ is —$CH_2$—$CH_2$—.

21. A collector composition as claimed in claim 15, in which the polyglycol is a polyethylene glycol alkyl ether of the formula (I) in which:
$R_1$ is a normal or branched alkyl group having 1 to 12 carbon atoms; and
$R_2$ is —$CH_2$—$CH_2$—.

22. A collector composition as claimed in claim 15, in which the polyglycol is a water soluble polyoxyethylene glycol of the formula (I) in which:
$R_1$ is hydrogen; and
$R_2$ is —$CH_2$—$CH_2$—.

23. A collector composition as claimed in claim 15, in which the polyglycol is a water soluble polyoxypropylene glycol of the formula (I) in which:
$R_1$ is hydrogen; and
$R_2$ is

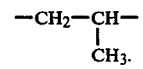

24. A collector composition as claimed in claim 15, in which the polyglycol has a molecular weight between 200 and 1000.

25. A collector composition as claimed in claim 15, in which the mixture of mercaptan and polyglycol comprises from 70% to 95% mercaptan on a volume basis.

26. A collector composition as claimed in claim 15, in which the mixture of mercaptan and polyglycol comprises from 80% to 90% mercaptan on a volume basis.

* * * * *